(12) United States Patent
Thüring et al.

(10) Patent No.: US 12,736,389 B2
(45) Date of Patent: Sep. 15, 2026

(54) APPARATUS FOR ACCUMULATING A FLUID

(71) Applicant: MEDELA AG, Baar (CH)

(72) Inventors: Martin Thüring, Sins (CH); Sebastian Höner, Thalwil (CH)

(73) Assignee: MEDELA AG, Baar (CH)

( * ) Notice: Subject to any disclaimer, the term of this patent is extended or adjusted under 35 U.S.C. 154(b) by 283 days.

(21) Appl. No.: 17/799,915

(22) PCT Filed: Feb. 17, 2021

(86) PCT No.: PCT/EP2021/053811

§ 371 (c)(1),
(2) Date: Aug. 15, 2022

(87) PCT Pub. No.: WO2021/165281

PCT Pub. Date: Aug. 26, 2021

(65) Prior Publication Data

US 2023/0066842 A1 Mar. 2, 2023

(30) Foreign Application Priority Data

Feb. 17, 2020 (EP) .................................... 20157736

(51) Int. Cl.
*G01F 23/292* (2006.01)

(52) U.S. Cl.
CPC ................................ *G01F 23/2922* (2013.01)

(58) Field of Classification Search
CPC .... G01F 23/28; G01F 23/292; G01F 23/2921; G01F 23/2922; G01F 23/2928; A61M 1/00; A61M 1/06; A61M 1/062
See application file for complete search history.

(56) References Cited

U.S. PATENT DOCUMENTS

2005/0228342 A1 10/2005 Yuen
2015/0283311 A1 10/2015 Alvarez et al.
(Continued)

FOREIGN PATENT DOCUMENTS

EP 3533479 A1 9/2019
EP 3610900 A1 2/2020
(Continued)

OTHER PUBLICATIONS

Office Action issued in JP 2022-549138, dated Feb. 20, 2024.
(Continued)

*Primary Examiner* — Fatemeh Esfandiari Nia
(74) *Attorney, Agent, or Firm* — MARSHALL, GERSTEIN & BORUN LLP

(57) ABSTRACT

An apparatus for accumulating a fluid, the apparatus including a drain bottle for containing the fluid, a reservoir having an outlet towards the drain bottle, the reservoir and the drain bottle communicating with each other via a valve provided in the outlet, a suction aperture connectable with a suction pump for creating a vacuum in the reservoir, an optical sensing device operably coupled to the reservoir and adjusted to measure the volume of the fluid standing in the reservoir, the optical sensing device comprising a light source and a detector, wherein the light source is configured to emit light towards the reservoir and the detector is configured to detect an intensity of the light emanating from the reservoir, and at least one light directing means for directing the light on its path from the light source to the detector.

8 Claims, 4 Drawing Sheets

(56) References Cited

U.S. PATENT DOCUMENTS

| | | | | |
|---|---|---|---|---|
| 2016/0220743 | A1 | 8/2016 | Guthrie et al. | |
| 2016/0220745 | A1 | 8/2016 | Guthrie et al. | |
| 2016/0375185 | A1* | 12/2016 | Meisberger ......... | A61M 1/0259 250/341.7 |
| 2019/0209747 | A1 | 7/2019 | Analytis et al. | |
| 2020/0000055 | A1 | 1/2020 | Mostert et al. | |
| 2022/0339332 | A1* | 10/2022 | Ochiai .................... | A61M 1/06 |

FOREIGN PATENT DOCUMENTS

| | | | | |
|---|---|---|---|---|
| JP | 2017509379 | A | 4/2017 | |
| JP | 6830335 | B2 * | 2/2021 | |
| WO | WO-2010109375 | A2 * | 9/2010 | .......... A47J 41/0094 |
| WO | WO-2014/161099 | A1 | 10/2014 | |
| WO | WO-2015/120321 | A1 | 8/2015 | |
| WO | WO-2018/045349 | A1 | 3/2018 | |
| WO | WO-2019166348 | A1 | 9/2019 | |
| WO | WO-2020/051438 | A1 | 3/2020 | |

OTHER PUBLICATIONS

International Search Report for Application No. PCT/EP2021/053811, dated Apr. 29, 2021.
European Search Report for Application No. 20157736.8, dated Aug. 3, 2020.
Chinese First Office Action for Application No. 2021800152229, dated Mar. 22, 2025.
Israel Office Action for Application No. 295363, dated Mar. 30, 2025.

* cited by examiner

APPARATUS FOR ACCUMULATING A FLUID

CROSS-REFERENCE TO RELATED APPLICATION

The present application is the US national phase of International Patent Application No. PCT/EP2021/053811, filed Feb. 17, 2021, which claims priority to European Application No.20157736.8, filed Feb. 17, 2020. The priority application, EP 20157736.8, is hereby incorporated by reference in its entirety.

FIELD OF THE DISCLOSURE

The present invention relates to an apparatus for accumulating a fluid.

WO 2018/045349 A1 discloses an apparatus comprising a collection vessel for containing breast milk, breast interfaces for creating a fluid seal against the breast and a pumping device operably coupled to the breast interfaces for extracting milk from the breast and accumulating it in the collection vessel. The apparatus further comprises sensors for characterizing the quantity and/or quality of the expressed milk. For determining the quantity, i.e. the volume of the fluid contained in the collection vessel, capacitive sensors are coupled to an inside wall of the collection vessel.

The pre-known apparatus leaves room for improvement.

An object of the present invention is to provide an improved apparatus for accumulating a fluid. In particular, the present invention aims at providing an apparatus for accumulating a fluid, which enables monitoring a parameter of the fluid entering the apparatus in an improved manner.

As a solution to the above object, the present invention proposes an apparatus with the features of claim 1.

BACKGROUND

The apparatus comprises a drain bottle for containing a fluid. Usually, the fluid is breast milk extracted from the female breast. However, in principle, the apparatus could be used with any other fluid which is preferably a liquid. The drain bottle may be shaped as a bottle, in particular a baby bottle. Accordingly, the drain bottle preferably has a bottom surface and a circumferentially closed wall extending from the bottom surface to form a container. Generally, the bottom surface is adapted to be placed on a horizontal surface and normally, the drain bottle has an opening opposite to the bottom surface.

Further, the apparatus comprises a reservoir having an outlet towards the drain bottle, the reservoir and the drain bottle communicating with each other via a valve provided in the outlet. The reservoir is usually provided in the inside of a bottle top attachment detachably mounted on an opening of the drain bottle. A suction pump is connectable with a suction aperture of the apparatus for creating a vacuum in the reservoir. Preferably, the suction aperture is provided at the bottle top attachment.

Normally, the bottle top attachment of the apparatus comprises a port for connecting a breast interface for creating a fluid seal against a breast, wherein the reservoir is adapted to communicate with the port such that milk extracted at the breast interface is guided into the reservoir via a suction force of the suction pump, which may be supported by gravitational force in case the apparatus is held in a position where the bottom surface of the drain bottle faces downwards.

The bottle top attachment can be decoupled from the drain bottle, so that the filled drain bottle can be connected to a bottle nipple for feeding a baby. The bottle top attachment is releasably connected, typically screwed onto threads of a bottleneck of the drain bottle.

The bottle top attachment is provided at an opening of the drain bottle which is typically formed by the bottleneck of the drain bottle. The bottom surface of the drain bottle is generally arranged on the end opposite the bottleneck. Usually, a drain bottle is designed such that it can stand freely and upright on the bottom surface of the drain bottle.

Directional information such as top, bottom, vertical, horizontal, etc. in all cases relates to an apparatus standing with the bottom surface on a flat, horizontal surface. Although a positon in which the bottom surface of the drain bottle faces downwards is a preferred use position, the apparatus may be used in a different position. For instance, the apparatus may be used to accumulate breast milk in a position in which the apparatus is turned upside down, i.e. the bottom surface facing upwards.

SUMMARY OF THE DISCLOSURE

The drain bottle according to the invention is typically produced from at least partially transparent thermoplastic material or glass. Particularly preferably, polypropylene is used. The drain bottle made of plastic material can be produced as a disposable bottle or as a returnable bottle and usually has a weight of 7.5 to 30 g. The reusable bottle preferably has a wall thickness of about 0.9 mm.

The nominal volume of the drain bottle is typically 80 to 250 ml, in particular 80 ml, 150 ml or 250 ml. The maximum volume that the drain bottle can accommodate is usually no greater than 330 ml.

The drain bottle preferably has a height of about 60 to 160 mm, preferably 66 mm, 99.5 mm, 102 mm, 136 mm or 148.5 mm. The diameter of the bottle neck is typically 33 mm. The maximum diameter of the drain bottle is typically no greater than 50 to 70 mm, preferably no greater than 53 mm, 60 mm or 65 mm. All dimensions are to be understood having a tolerance of ±10%, preferably ±5%.

The drain bottle generally has a substantially cylindrical bottle body which comprises the circumferentially closed wall of the drain bottle and which tapers conically to form a bottleneck. The diameter of the bottle body can also vary over its length. For example, the bottle body can have several cylindrical sections of different diameters, which can in particular be connected by one or more conically shaped sections. The bottleneck usually has the smallest diameter. The bottleneck is preferably provided with an external thread which can be connected with an internal thread of the bottle top attachment.

The reservoir is typically designed such that milk drops cannot drop directly through the reservoir. The lower side wall of the reservoir is preferably fluid-tight. The geometry of the reservoir defines a cavity that has a certain volume. This volume is typically between 0.5 ml and 4 ml, preferably between 0.8 ml and 1.5 ml, and more preferably between 1.0 ml and 1.3 ml.

The reservoir has an outlet towards the drain bottle and a valve is arranged in the outlet. The valve is typically adapted such that it retains at least a certain amount of milk in the reservoir. The valve is preferably designed such that, in a closed position, it bears against the outflow opening of the outlet during a dropwise filling. If the fluid pressure in the reservoir exceeds a resistance threshold value of the valve, then the valve is forced to an open position, so that a certain amount of milk can flow out of the reservoir into the baby bottle. The valve can be designed, for example, according to WO 2014/161099 A1 originating from the applicant, or in the manner of a flap valve according to US 2015/0283311 A1. Typically, the reservoir does not completely empty as a decrease in fluid pressure causes the valve to return to the closed position.

The resistance threshold value of the valve is preferably adjustable. The valve may be pretensioned against the outflow opening. The filling height is preferably between 10 mm and 30 mm, and more preferably between 15 and 25 mm. The residual amount that typically remains in the reservoir after the valve is again closed is typically 0.1 ml to 0.3 ml.

The fluid pressure of the milk in the reservoir acting upon the valve is hydrostatic pressure. The valve is preferably designed as a one-way valve. Further, preferably, the valve has a valve membrane which, due to its geometry, remains in the resting position during a fluid pressure on the valve membrane from the outside of the reservoir. In the resting position, the valve membrane rests against the outflow opening of the outlet. The outflow opening is commonly provided on a side wall of the reservoir, so that the valve membrane is forced, preferably pivoted, away from the vertical to the open position. The valve membrane is preferably made of a flexible plastic material, in particular silicone.

A flow rhythm caused by the vacuum cycles of the pump, i.e. a portioned outflow of milk into the drain bottle can then be implemented in a simple and energy-saving manner. At an end of a vacuum cycle, suction force of the vacuum pump essentially vanishes which typically initiates outflow of milk from the reservoir into the drain bottle. Generally, the volume of the milk standing in the reservoir is measured for each vacuum cycle of the pump just before the valve in the outlet of the reservoir opens.

The apparatus comprises an optical sensing device operably coupled to the reservoir and adjusted to measure the volume of the fluid standing in the reservoir. The optical sensing device comprises a light source and a detector, wherein the light source is configured to emit light towards the reservoir and the detector is configured to detect an intensity of the light emanating from the reservoir. The apparatus comprises at least one light directing means for directing the light on its path from the light source to the detector. The terms “optical” and “light” in this context are not limited to visible light, but basically refer to the entire electromagnetic spectrum. The optical sensing device is preferably adapted to the infrared range.

A light directing means according to the invention may include or be devised as any optical component capable of receiving and transmitting or reflecting light, preferably infrared light. Usually, a light directing means according to the present invention is adjusted to transmit or reflect at least 30%, preferably at least 50%, and more preferably at least 70% of the incoming light intensity. The light directing means may reflect light with an angle equal to the angle of incidence, or transmit light with a different angle than the angle of incidence. A light directing means according to the present invention may guide light a certain distance, preferably parallel or tangential to a reservoir wall, before the light is redirected by the light directing means towards the reservoir, to preferably pass a reservoir wall orthogonally. Alternatively, a light directing means according to the present invention may not redirect incoming light, i.e. it may be formed by a translucent window in a reservoir wall allowing light to pass into or out of the reservoir respectively.

The light directing means is preferably adapted to direct the light such that it passes the reservoir transversally to a path of the milk through the reservoir. Further, the optical sensing device is arranged to detect a different signal with the detector, depending on whether the light passes through milk or air on its way through the reservoir. Thus, it can be determined to which level milk has accumulated in the reservoir. Since the geometry of the reservoir is usually known, a conclusion can be drawn about the milk filling quantity in the reservoir.

Preferably, the optical sensing device is configured as a structural unit being detachable from the reservoir. Thus, the optical sensing device which usually is to be cleaned more carefully than the rest of the apparatus can be separated from the drain bottle and the reservoir. The drain bottle and the bottle top attachment comprising the reservoir may be cleaned in a dishwasher, whereas the optical sensing device may be cleaned by hand. More preferably, the optical sensing device is housed in a cap detachably mounted to the bottle top attachment. Typically, the bottle top attachment comprises a receiving section in which a reservoir wall is exposed and which is adapted to receive the optical sensing device. Thus, the optical sensing device is arranged laterally to the reservoir. According to a preferred development, the light source and the detector are provided at the same side of the reservoir, which side corresponds to the side of the reservoir exposed in the receiving section. With this preferred development, the light source and the detector are facing essentially into the same direction and the light directing means is provided for directing the light on its path from the light source to the detector.

Preferably, the light source and the detector are provided at the same level along the path of the milk through the reservoir (“milk path” in the following). In an upright position of the apparatus, the milk path normally extends essentially in a vertical direction, such that the light source and the detector are provided at the same vertical level in this position.

Preferably, the light source and the detector are spatially separated from a reservoir wall. That is, it is preferred that the light source and the detector are not directly connected to the reservoir wall. This facilitates the decoupling of the optical sensing device from the reservoir. Usually, a cover is provided between the optical sensing device and the reservoir for shading light not belonging to the light source of the apparatus, wherein the shade comprises apertures assigned to the light source and the detector respectively.

Preferably, the spatial distance between the light source and the detector corresponds at minimum to a width of the reservoir transversal to the milk path. This follows directly when the light source and the detector are provided at opposite sides of the reservoir and face each other. In case the light source and the detector are provided at the same side of the reservoir and face essentially into the same direction, at least one light directing means is provided for directing the light on its path from the light source to the detector. In particular, the light source may be facing into a direction which is parallel or tangential to a side wall of the reservoir located next to the exposed side of the reservoir and the receiver may be facing into a direction which is parallel or tangential to the other side wall of the reservoir located next to the exposed side of the reservoir. Usually those two side walls of the reservoir located next to the exposed side of the reservoir are opposing sidewalls. Preferably, at least one light directing means is provided on each of those two side walls. Thus, light emitted from the light source enters into the light directing means associated to the light source, then is redirected by the light directing means to enter the reservoir at one side and, after the light has passed through the reservoir, is redirected by the other light directing means on the opposite side towards the detector.

Preferably, the at least one light directing means comprises at least one of the following optical elements: a reflector, a prism, an optical fiber or any other optical component known in the art that is suitable to redirect incoming light at an off angle.

More preferably, the at least one light directing means is provided between the light source and the reservoir such that light emitted from the light source is redirected by the light directing means to pass the reservoir wall at an right angle. Further, preferably, at least one light directing means is provided between the reservoir and the detector such that light emanating from the reservoir at a substantially right angle with respect to a reservoir wall is redirected towards the detector. Thereby, losses due to scattering at the reservoir walls are reduced. The reservoir walls are generally translucent at least for wavelengths in the working range of the light source and the detector.

According to a preferred development of the present invention, a plurality of light sources are provided in an array, wherein each light source is arranged at a different level along the milk path, a plurality of detectors are provided in an array, wherein each detector is arranged at a different level along the milk path, and each of the light sources forms a pair with one of the detectors which is provided at the same level. Usually, the plurality of light sources and detectors cover at least the lower half of the milk path in the reservoir, and preferably essentially the entire milk path. Thereby, a detailed resolution of the milk standing in the reservoir can be achieved.

Typically, the light sources (and the detectors respectively) are separated from each other by about 0.2 to 1.0 mm, preferably 0.3 to 0.8 mm and more preferably about 0.4 mm. A spacing between the centres of the light sources is preferably about 1.2 mm. Normally, infrared LEDs are provided as light sources, which LEDs have typically a dome shape and an angle of radiation of approximately 60°. The detectors are usually infrared light receiving phototransistors, which phototransistors may have a range of spectral bandwidth of 730 to 1100 nm. The wave length of peak sensitivity of the photo transistors may be around 940 nm. The viewing angle of the phototransistors may be approximately 130°.

In the preferred development, two elements of the light directing means are provided at opposite sides of the reservoir, wherein the elements extend along the milk path. Preferably, the elements have a reflecting surface for reflecting light of the light sources, the reflecting surface forming an angle (of preferably about 45°) with a reservoir wall.

In an upright position of the apparatus, the milk path extends in an essentially vertical direction. Accordingly, the arrays of light sources and detectors respectively are oriented essentially vertically in the upright position of the apparatus, wherein each light source forms a pair with the detector having the same vertical level. The vertical extension of the reflecting surfaces of the elements of the light directing means then at least corresponds to a vertical extension of the arrays.

The reflecting surfaces are arranged such that light emitted from the light sources hits one of the reflecting surfaces at an angle which is different than a right angle and that light coming out from the reservoir and passing the reservoir wall at an right angle hits the other reflecting surface at an angle which is different from a right angle. The light paths between light sources and detectors may have a U-shape in a top view onto the reservoir bottom, wherein the flanks of the U extend between the light source and the one reflecting surface, and between the detector and the other reflecting surface in a direction which is parallel or tangential to opposing sidewalls and wherein the base of the U extends between the reflecting surfaces of the light directing means, the base of the U crossing the reservoir and preferably passing through a centre of the reservoir.

A cross-section of the reservoir in a top view onto the bottom of the reservoir may be square, rectangular, polygonal, round or oval.

According to a preferred development of the present invention, in an upright position, a plurality of light sources are provided in an essentially horizontal row to face, in an essentially vertical direction, the light directing means provided between the light source and the reservoir, and a plurality of detectors are provided in an essentially horizontal row to face, in an essentially vertical direction, the light directing means provided between the reservoir and the detector. That is, in this preferred development, the arrays of light sources and detectors are arranged transverse to the milk path, whereas in the previously mentioned development, the arrays of light sources and detectors are arranged parallel to the milk path.

With the arrays of light sources and detectors being arranged transverse to the milk path, the light directing means provided between the light sources and the reservoir comprises a plurality of reflecting surfaces arranged in a stair at or in the reservoir wall, each reflecting surface being provided at a different height of the reservoir wall (different level along the milk path) and being assigned to one of the light sources, and the light directing means provided between the reservoir and the detectors comprises a plurality of reflecting surfaces arranged in a stair at or in the opposite reservoir wall, each reflecting surface being provided at a different height of the opposite reservoir wall (different level along the milk path) and being assigned to one of the detectors. According to this preferred development, each of the light sources forms a pair with one of the detectors which is provided at the same horizontal level. Again, the light path between the light sources and detectors may have a U-shape. However, in this preferred development, the U-shape is seen in a side view of the reservoir. In any case, the base of the U-shape has a different vertical level (different level along the milk path) for different pairs of light sources and detectors.

Further details and advantages of the present invention will be obtained from the following description of an embodiment and the accompanying drawings, in which:

BRIEF DESCRIPTION OF THE SEVERAL VIEWS OF THE DRAWING

FIG. 1 illustrates an apparatus 2 for accumulating a fluid, the apparatus 2 comprising a drain bottle 4 for containing the fluid and a bottle top attachment 6 screwed onto a bottleneck of the drain bottle 4. A reservoir 8 is provided inside the bottle top attachment 6, wherein the reservoir 8 has an outlet 10 towards the drain bottle 4 and wherein the reservoir 8 and the drain bottle 4 communicate with each other via a valve 12 provided in the outlet 10 (cf. FIG. 2). The bottle top attachment 6 has a collar 7, which is screwed to the drain bottle and connected to an upper housing portion 9 of the bottle top attachment 6 by laserwelding.

The bottle top attachment 6 is provided with a suction aperture 14 connectable with a suction pump for creating a vacuum in the reservoir 8, and a port 16 that is connected—in FIG. 1—to a breast interface 18 for creating a fluid seal against a breast. Inside the bottle top attachment 6, there is provided a membrane 20 interacting with the suction pump via suction aperture 14 for creating a vacuum in a bottle top attachment chamber including the reservoir. Further, the membrane 20 forms a media separation for air sucked by the suction pump and milk extracted at the breast interface (cf. FIG. 4).

An optical sensing device 22 is covered by a cap 24 which is detachably mounted on the bottle top attachment 6. The optical sensing device 22 is operably coupled to the reservoir 8 and adjusted to measure the volume of the fluid standing in the reservoir 8. Further, the optical sensing device 22 comprises light sources 26 and detectors 28, wherein the light sources 26 are configured to emit light towards the reservoir 8 and the detectors 28 are configured to detect an intensity of the light emanating from the reservoir 8. Light directing means include a first light guide element 30 provided at a side wall of the reservoir 8 that has a square cross-section in this embodiment, the first light guide element 30 directing light coming from the light sources 26 towards the reservoir 8 (cf. FIG. 8). Light directing means further include a second light guide element 32 provided at the opposite side wall of the reservoir 8 for directing light emanating from the reservoir 8 towards the detectors 28. Each of the light guide elements 30, 32 comprises a reflecting surface 34, 36 which forms an angle of 45° with a reservoir wall 38, 40. In the top view onto the reservoir bottom as displayed in FIG. 8, the light paths between the light sources 26 and the detectors 28 have a U-shape.

Figure 2:
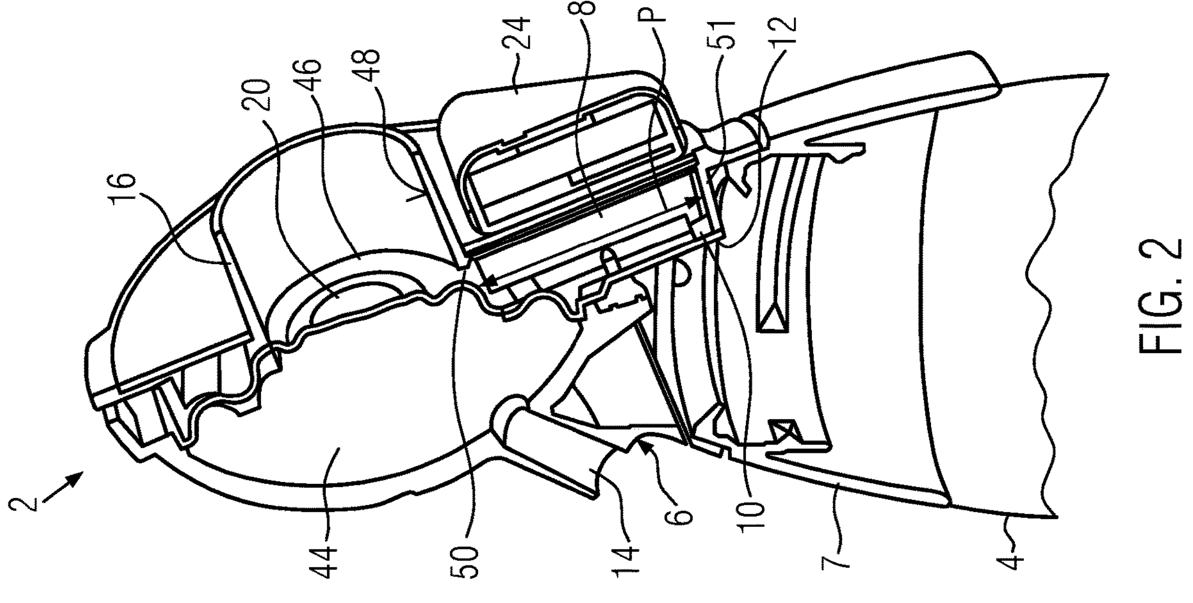
FIG. 2 illustrates a cross-sectional view of the embodiment.
Figure 1:
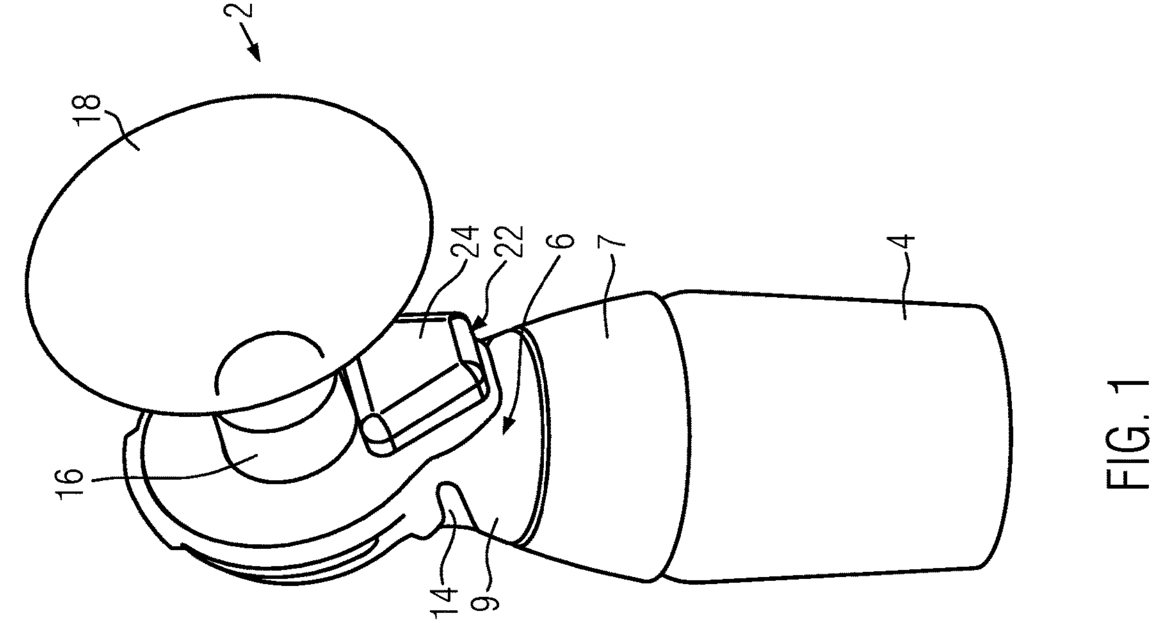
FIG. 1 illustrates a side view of the embodiment connected with a breast interface.
Figure 4:
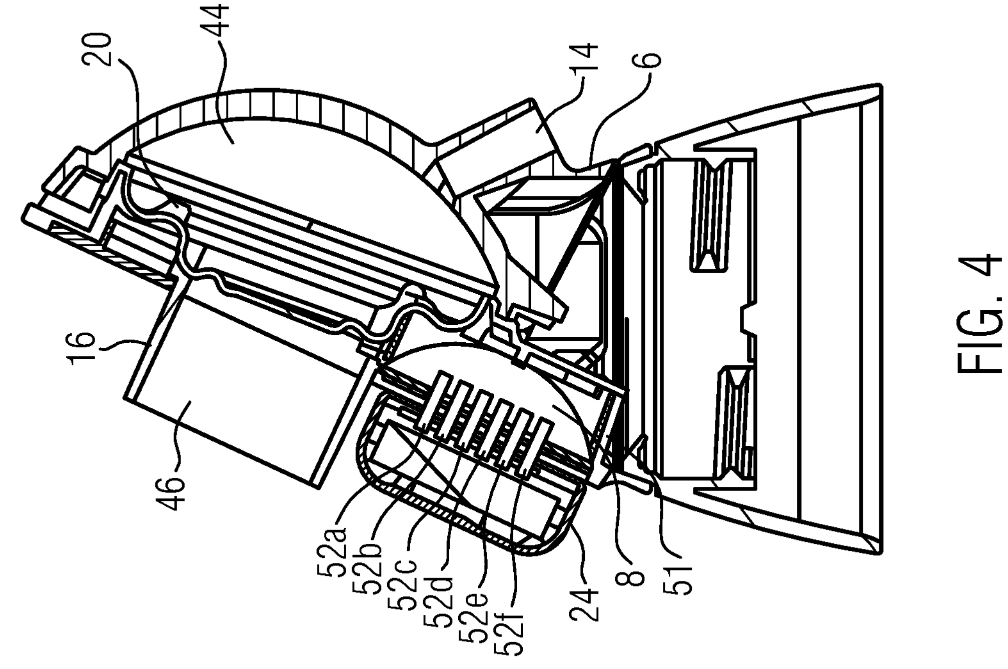
FIG. 4 illustrates a cross-sectional view according to cutting line A-A in FIG. 3.
Figure 3:
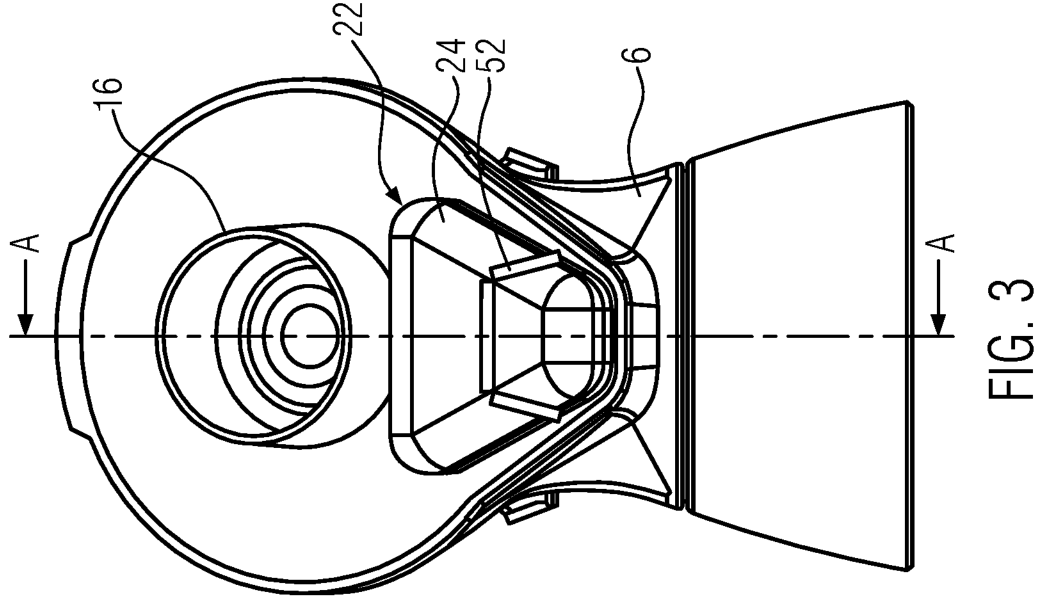
FIG. 3 illustrates another side view of the embodiment.
Figure 7:
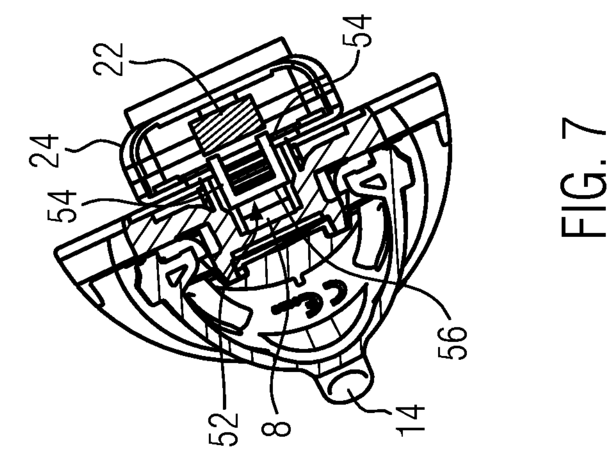
FIG. 7 illustrates a cross-sectional view according to cutting line C-C in FIG. 5.
Figure 6:
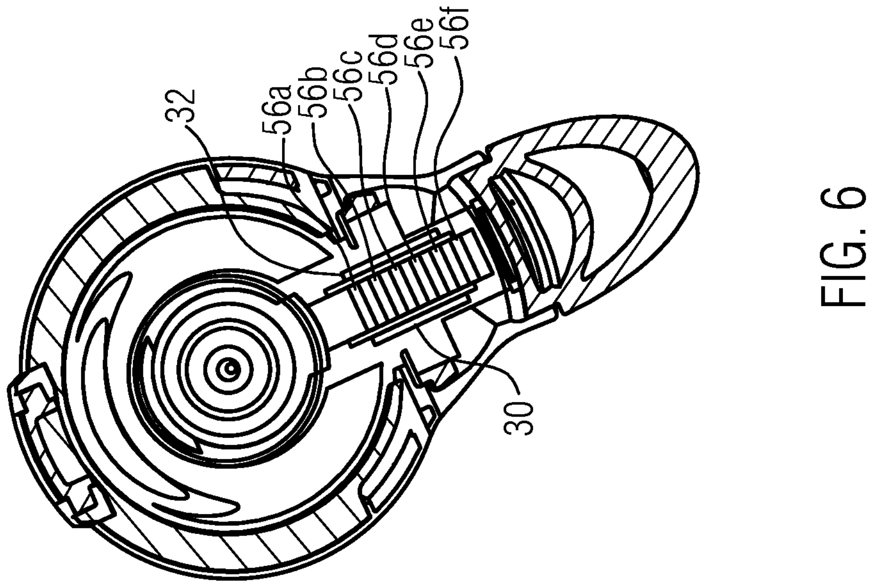
FIG. 6 illustrates a cross-sectional view according to cutting line B-B in FIG. 5.
Figure 5:
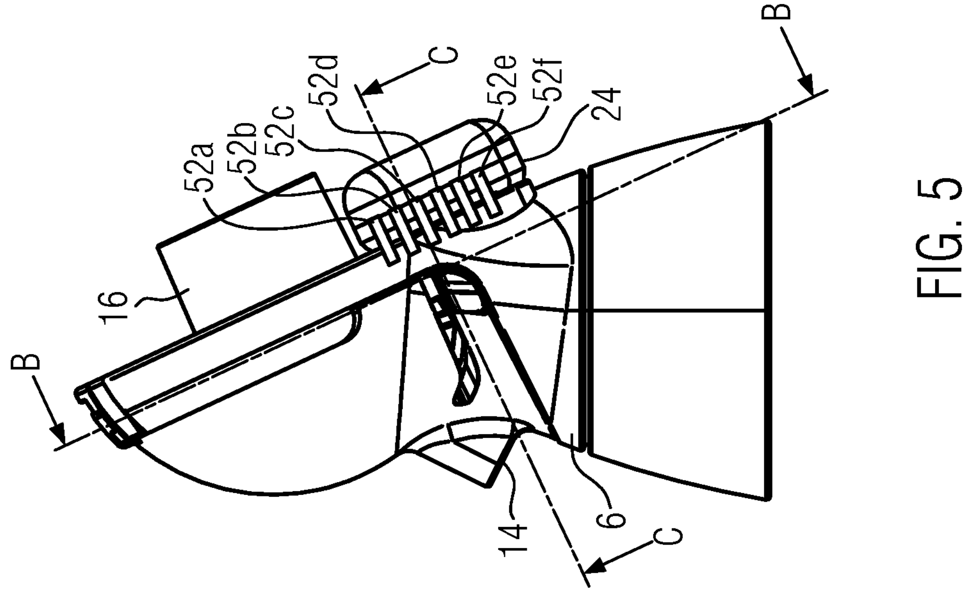
FIG. 5 illustrates another side view of the embodiment.
Figure 8:
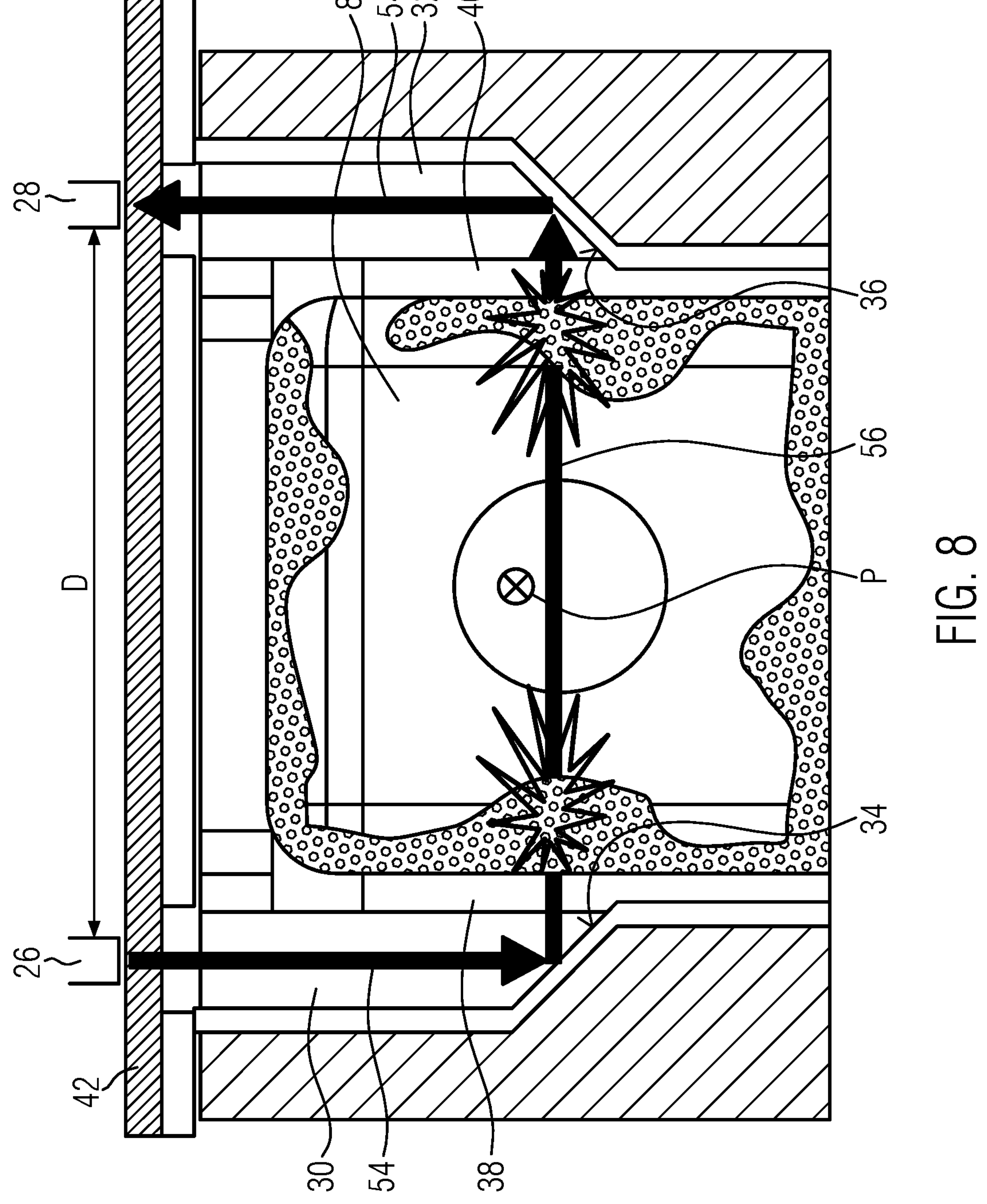
FIG. 8 illustrates schematically a cross-section through the reservoir transvers to the milk path in a top view onto the reservoir bottom.

The light sources 26 and the detectors 28 are provided at the same level along the milk path through the reservoir. Usually, the apparatus 2 is held in an upright position such that milk is passing through the reservoir in an essentially vertical direction. Thus, usually, pairs of light sources 26 and detectors 28 are provided at the same vertical level.

The valve 12 provided in the outlet 10 usually remains closed as long as a suction force of the suction pump is maintained. In case that accumulated milk forms a milk column in the reservoir and light emitted from a light source 26 passes through the milk column on its way to a detector 28, light will be absorbed or scattered by the milk column. Thus, the intensity of light detected by the detector 28 will be lower in this case compared to a case where less milk is accumulated in the reservoir and a milk column does not reach the level of the light source 26 and the detector 28.

The optical sensing device 22 is configured as a structural unit housed by the cap 24 and detachable from the reservoir 8 together with the cap 24. The cap 24 is releasably locked to the bottle top attachment 6 in this embodiment. Accordingly, the optical sensing device 22 and the bottle top attachment 6 comprising the reservoir 8 can be cleaned separately. Further, the cap 24 protects the optical sensing device 22 from damages and stray light.

A cover 42 is provided to spatially separate the reservoir walls from the light sources 26 and the detectors 28 and to prevent light entering the reservoir 8 without passing through the first light guide element 30.

FIG. 2 illustrates that the membrane 20 in the bottle top attachment 6 separates an air suction chamber 44 communicating with a suction pump and a milk suction chamber 46 which includes the reservoir 8, the milk suction chamber 46 communicating with the drain bottle 4 via the valve 12 provided in the outlet 10 of the reservoir 8 and with the breast via breast interface 18 connectable to the port 16. The vacuum created by the suction pump in the air suction chamber 44 creates a negative pressure (suction force) in the milk suction chamber 46 acting on the breast. In an upright position of the apparatus 2, the port 16 comprises an inclined lower surface 48. A top end of the reservoir 8 is located right next to the inclined surface 48, wherein an opening 50 towards the reservoir 8 is provided between the membrane 20 and the inclined surface 48. In the upright position of the apparatus 2, the milk path P extends in an essentially vertical direction. The milk path P extends between the opening 50 of the reservoir 8 and a bottom surface 51 of the reservoir 8. Depending on the orientation, in which the apparatus 2 is held, the milk path P may not be parallel to the vertical axis.

In the essentially upright position shown in FIG. 2, the outlet 10 of the reservoir 8 towards the drain bottle 4 is provided in a side wall of the reservoir in the lower left corner of the reservoir 8. The valve 12 provided in the outlet 10 according to this embodiment is a flap valve which opens towards the central longitudinal axis of the apparatus 2. The optical sensing device 22 is provided next to the side wall of the reservoir 8 opposite to the side wall comprising the outlet 10.

The optical sensing device 22 comprises a plurality of light sources 26 and detectors 28 which are arranged in two arrays extending along the milk path P, wherein each light source 26 forms a pair with a detector 28 provided at the same level along the milk path P. Between each pair, a light path 52 is formed having a U-shape with two flanks 54 and a base 56. The base 56 of the light paths 52 crosses the reservoir 8 orthogonally to the milk path P, wherein each base 56 passes through the central longitudinal axis of reservoir 8 and wherein each base 56 of the light paths 52 crosses the reservoir at a different level along the milk path P. Thus, by comparing the intensity measured by the different detectors 28, one can determine how much light was absorbed at the different levels along the path P. Accordingly, by knowing the geometry of the reservoir 8 and knowing the height of the milk column reaching a certain level along the milk path P determined by the optical sensing device 22, one can determine the milk volume contained in the reservoir 8.

LIST OF REFERENCE SIGNS

2 apparatus
4 drain bottle
6 bottle top attachment
7 collar
8 reservoir
9 upper housing part
10 outlet

12 valve
14 suction aperture
16 port
18 breast interface
20 membrane
22 optical sensing device
24 cap
26 light source
28 detector
30 first light guide element
32 second light guide element
34, 36 reflecting surface
38, 40 reservoir wall
42 cover
44 air suction chamber
46 milk suction chamber
48 inclined surface
50 reservoir opening
51 bottom surface of the reservoir
52 U-shaped light path
54 flanks of U-shaped light path
56 base of U-shaped light path
D spatial distance between the light source and the detector of one pair
P milk path

The invention claimed is:

1. An apparatus for accumulating breast milk extracted from a female breast, the apparatus comprising:

a drain bottle for containing the breast milk, a bottle top attachment provided on a bottleneck of the drain bottle, a reservoir disposed inside the bottle top attachment, the reservoir having an outlet towards the drain bottle, the reservoir and the drain bottle communicating with each other via a valve provided in the outlet, a suction aperture provided in the bottle top attachment and connectable with a suction pump for creating a vacuum in the reservoir, an optical sensing device associated with the bottle top attachment and operably coupled to the reservoir and adjusted to measure the volume of the breast milk standing in the reservoir by measuring a liquid level in the reservoir, the optical sensing device comprising a light source and a detector, wherein the light source is configured to emit light towards the reservoir and the detector is configured to detect an intensity of the light emanating from the reservoir, and at least one light directing means for directing the light on its path from the light source to the detector, a first light guide element of the light directing means is provided between the light source and the reservoir such that light emitted from the light source is redirected by the first light guide element to pass a reservoir wall at a right angle, a second light guide element of the light directing means is provided between the reservoir and the detector such that light emanating from the reservoir at a substantially right angle with respect to a reservoir wall is redirected towards the detector, a plurality of light sources are provided in a row transverse to the milk path (P) to face, in a direction essentially parallel to the milk path (P), the first light guide element provided between the light source and the reservoir, a plurality of detectors are provided in a row transverse to the milk path (P) to face, in a direction essentially parallel to the milk path (P), the second light guide element provided between the reservoir and the detector, the first light guide element provided between the light source and the reservoir comprises a plurality of reflecting surfaces arranged in a first set of stairs at or in the reservoir wall, each reflecting surface being provided at a different height of the reservoir wall and being assigned to one of the light sources, the second light guide element provided between the reservoir and the detector comprises a plurality of reflecting surfaces arranged in a second set of stairs at or in the opposite reservoir wall, each reflecting surface being provided at a different height of the opposite reservoir wall and being assigned to one of the detectors, and each of the light sources forms a pair with one of the detectors which is provided at the same level in a direction transverse to the milk path (P).

2. An apparatus for accumulating a fluid, the apparatus comprising:

a drain bottle for containing the fluid, a reservoir having an outlet towards the drain bottle, the reservoir and the drain bottle communicating with each other via a valve provided in the outlet, a suction aperture connectable with a suction pump for creating a vacuum in the reservoir, an optical sensing device operably coupled to the reservoir and adjusted to measure the volume of the fluid standing in the reservoir, the optical sensing device comprising a plurality of light sources and a plurality of detectors, wherein the light sources are configured to emit light towards the reservoir and the detectors are configured to detect an intensity of the light emanating from the reservoir, and at least one light directing means for directing the light on its path from the light sources to the detectors, wherein a first light guide element of the light directing means is provided between the light sources and the reservoir such that light emitted from the light sources is redirected by the first light guide element to pass a reservoir wall at a right angle, a second light guide element of the light directing means is provided between the reservoir and the detectors such that light emanating from the reservoir at a substantially right angle with respect to a reservoir wall is redirected towards the detectors, the light sources are provided in a row transverse to a milk path in the reservoir to face, in a direction essentially parallel to the milk path, the first light guide element, the detectors are provided in a row transverse to the milk path to face, in a direction essentially parallel to the milk path, the second light guide element, the first light guide element comprises a plurality of reflecting surfaces arranged in a first set of stairs at or in the reservoir wall, each reflecting surface being provided at a different height of the reservoir wall and being assigned to one of the light sources, the second light guide element comprises a plurality of reflecting surfaces arranged in a second set of stairs at or in the opposite reservoir wall, each reflecting surface being provided at a different height of the opposite reservoir wall and being assigned to one of the detectors, and each of the light sources forms a pair with one of the detectors which is provided at the same level in a direction transverse to the milk path.

3. The apparatus according to claim 2, wherein the optical sensing device is configured as a structural unit being detachable from the reservoir.

4. The apparatus according to claim 3, wherein the optical sensing device is housed by a cap detachably mounted to a bottle top attachment connected to the drain bottle, the reservoir being provided in the bottle top attachment.

5. The apparatus according to claim 2, wherein the light sources and the detectors are provided at the same level along the milk path.

6. The apparatus according to claim 2, wherein the light sources and the detectors are spatially separated from a reservoir wall.

7. The apparatus according to claim 2, wherein a spatial distance between the light sources and the detectors corresponds at minimum to a width of the reservoir transverse to the milk path.

8. The apparatus of claim 1, the bottle top attachment having a collar that is securable to the drain bottle.

* * * * *